United States Patent [19]

Gutterman

[11] Patent Number: 4,476,711
[45] Date of Patent: Oct. 16, 1984

[54] COMBINED VIBRATION AND TEMPERATURE SENSOR

[75] Inventor: Jeffrey S. Gutterman, Hilton, N.Y.

[73] Assignee: General Motors Corporation, Detroit, Mich.

[21] Appl. No.: 487,452

[22] Filed: Apr. 21, 1983

[51] Int. Cl.³ ............................................. G01M 15/00
[52] U.S. Cl. ........................................ 73/35; 374/144
[58] Field of Search ................. 73/35, 117.3; 374/144, 374/145; 123/588, 625; 310/315, 319, 334

[56] References Cited

U.S. PATENT DOCUMENTS 4,299,117 11/1981 Andrews et al. ..................... 73/35
4,391,126 7/1983 van Zanten ............................ 73/35

Primary Examiner—Jerry W. Myracle
Attorney, Agent, or Firm—Robert M. Sigler

[57] ABSTRACT

A combined vibration and temperature sensor for an internal combustion engine comprises a piezoelectric disc in mechanical and thermal contact with an engine throttle body and connected electrically in series with an impedance effective to form a voltage divider having a predetermined normalized voltage output at a reference temperature and 50 kilohertz. A 50 kilohertz voltage source is connected across the voltage divider and the vibration signal output provides a temperature signal at 50 kilohertz and an engine vibration signal at a lower frequency such as 5-7 kilohertz.

3 Claims, 4 Drawing Figures

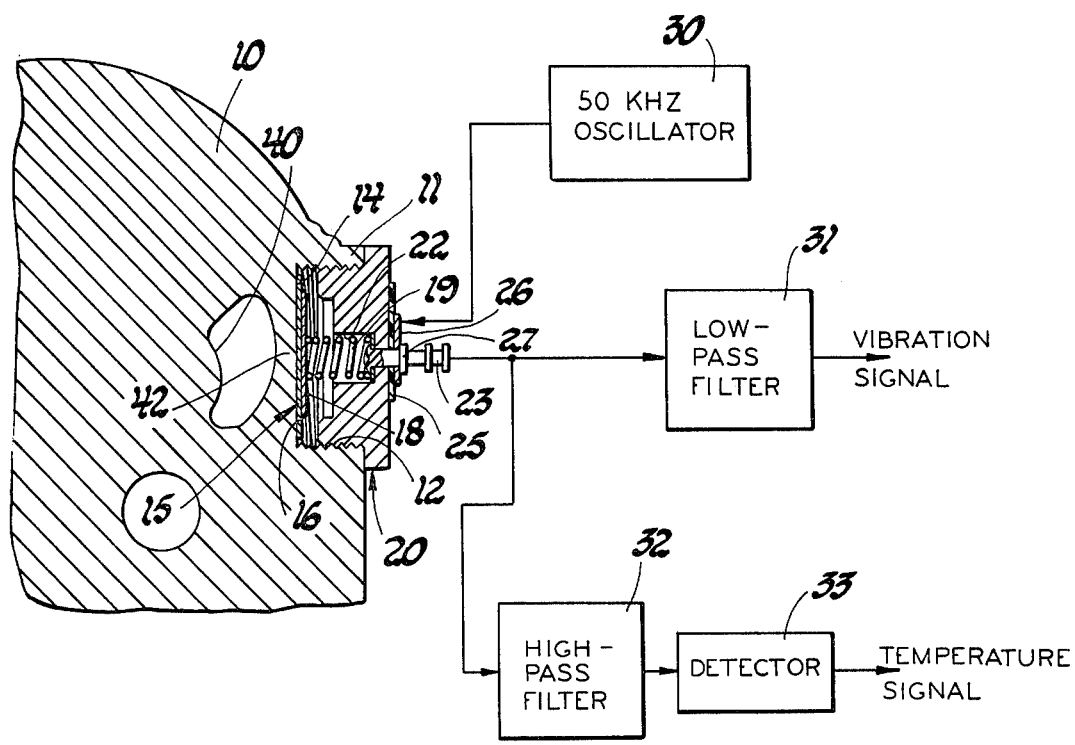
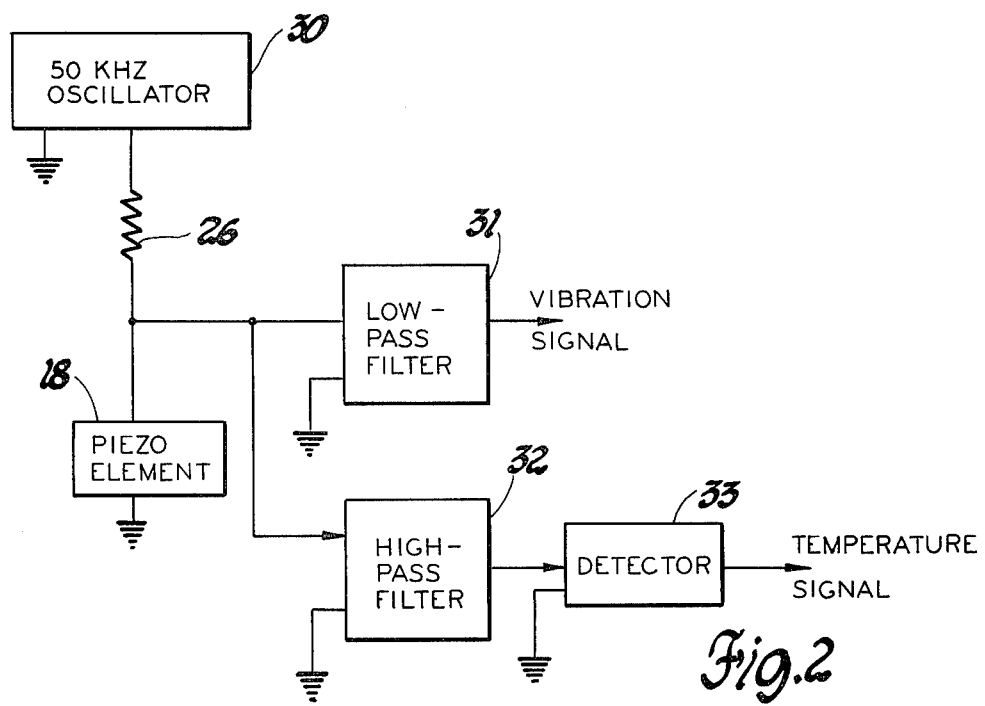
Fig.1
Fig.2

COMBINED VIBRATION AND TEMPERATURE SENSOR

BACKGROUND OF THE INVENTION

This invention relates to a sensor effective to measure the operating parameters of an internal combustion engine. It particularly relates to such a sensor effective to generate output signals in response to both engine vibration and temperature.

It is known to provide an internal combustion engine vibration sensor of the type employing a piezoelectric disc in a housing having means effective to transfer vibrations of the engine into flexures of the piezoelectric disc. Such a vibration sensor is shown in the U.S. Pat. No. to Keem 4,254,354 issued Mar. 3, 1981; and many other examples are known. Engine vibration sensors using piezoelectric elements may be used for knock detection or the detection of other engine vibrations characteristic of specific engine operational events. In addition, engine temperature sensors of various kinds are known to be effective to generate a signal indicative of the temperature of some portion of the engine or of the engine cooling fluid, although the inventor is not aware of any such engine temperature sensor employing a vibrating piezoelectric element as the temperature sensitive element.

Engine vibration and temperature sensors are merely two of the many kinds of sensors employed in today's precisely controlled engines. In fact, the sensors of the engine control system can constitute a substantial portion of the cost of such engine controls; and a reduction in the number of such sensors may well help to reduce such costs. Although the day of the single sensor engine control system may not yet be at hand, attempts have been made in the prior art towards such a goal. One such attempt is the multifunction engine sensor of the U.S. Pat. No. to Andrews et al 4,299,117, issued Nov. 10, 1981. This is actually two separate sensors—a piezoelectric acoustic electric sensor and a thermistor temperature sensor—enclosed in a single package. The thermistor provides a signal of engine cooling temperature at one output terminal while the piezoelectric element provides an acoustically derived engine vibration signal on a different output terminal.

SUMMARY OF THE INVENTION

The sensor of this invention provides a further step in the art toward the goal of multifunction sensors by generating two separate signals—engine vibration and engine temperature—from a single piezoelectric element at a single output terminal. The sensor, which is designed to be mounted on an engine carburetor or throttle body, has a simple and potentially inexpensive structure; and further savings are potentially realized in the connecting wire to the single output terminal. The sensor provides a signal of vibrations transmitted through the carburetor or throttle body and may be constructed and mounted with a variety of tuning capabilities, both in degree and in frequency, for the detection of such engine operating events as knock, cylinder combustion and so forth. As a temperature sensor, the sensor will measure the temperature of the portion of the engine upon which it is mounted. If it is mounted, as proposed, on the carburetor or throttle body, it may find the most use as an engine air intake temperature sensor, although other uses are not ruled out. With slight modifications in structure, it might be used in the engine coolant passage so that the temperature measured would be engine coolant temperature as in the Andrews et al patent cited above.

Briefly described, this invention is a combined engine vibration and temperature sensor comprising a piezoelectric element effective to generate a vibration responsive output voltage and having an electrical impedance which varies in a predictable way with temperature at a predetermined electrical frequency, said element being mechanically and thermally coupled to an engine component. It further comprises an electrical resistor connected in series with the piezoelectric element, said resistor having an impedance effective to produce a predetermined impedance ratio with the piezoelectric element at a predetermined temperature, and apparatus effective to apply a constant predetermined AC voltage across the series connected piezoelectric element and resistor and separately sense the voltage generated across the piezoelectric element in response thereto and the voltage generated thereacross in response to the vibration thereof. The apparatus thus provides separable vibration and temperature signals from a single piezoelectric element and further provides an indication of sensor failure or disconnection. Further details and advantages of the invention will be apparent from the accompanying drawings and following description of a preferred embodiment.

SUMMARY OF THE DRAWINGS

FIG. 1 is a combined cutaway and block diagram of a sensor according to this invention with the required electrical apparatus connected thereto.

FIG. 2 is a block and schematic diagram of the electrical circuit of the sensor and the connecting electrical apparatus.

DESCRIPTION OF THE PREFERRED EMBODIMENT

Figure 3:
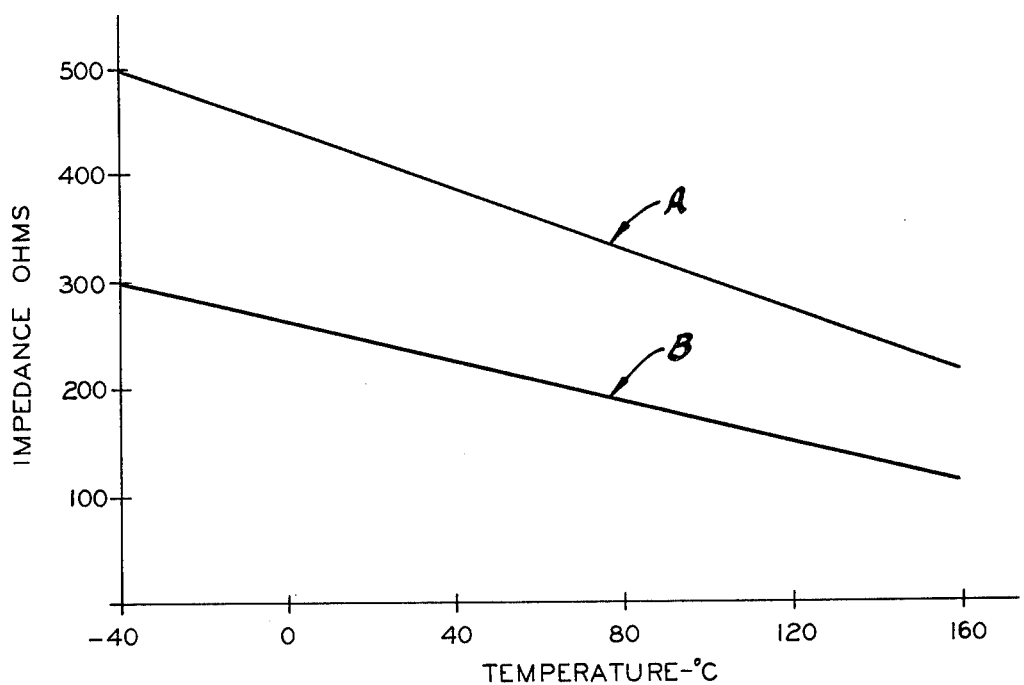
FIG. 3 shows a pair of sample impedance/temperature curves of piezoelectric elements for use in the sensor of this invention.

Referring to FIG. 1, a portion of an engine throttle body 10 is shown. Throttle body 10 may be die cast of aluminum in the normal manner and is provided with a mounting boss 11 having an internally threaded bore 12. Bore 12 has a flat bottom 14 against which is held a sensor element 15 comprising a thin brass disc 16 bonded to a circular piezoelectric disc 18 of smaller diameter. Sensor element 15 is a commercially available item used for buzzers and alarms in small electronic devices such as watches. Two particular types are commercially available as piezo devices 7SB-27-5 and 7SB-20-7 from muRata Erie Corporation having resonant frequencies of 5 and 7 kilohertz and typical temperature-impedance curves A and B, respectively in FIG. 3. They are suitable for the detection of knock in an internal combustion engine, since the first resonant mode frequency of knock for a great many engines is in the range 5-7 kilohertz.

Sensor element 15 is mounted with the brass side against flat bottom 14 of bore 12 with a coil compression spring 19 made of an electrically conducting steel or similar metal engaging the piezoelectric disc 18 for electrical signal conduction therefrom. Spring 19 further supplies the holding force which ensures that sensor element 15 will partake of the engine vibrations present at the flat bottom 14 of bore 12 and form a good electrical ground connection with throttle body 10. An externally threaded, screwed in plug 20 engages the internally threaded bore 12 and includes a central bore 22 as a base and guide for the opposite end of spring 19. A terminal member 23 physically and electrically contacts the end of spring 19 within bore 22 of plug 20 by any known means and projects outward through plug 20 to provide an external electrical connection for piezoelectric disc 18 through spring 19. An insulating member 25 may be provided on the outside of plug 20 if plug 20 is not made of an insulating material; and a resistor 26 may be held against insulating member 25 by a shoulder 27 of terminal member 23. Resistor 26 may take a variety of forms; but is designed to be a resistive element of the type which has a resistance which may be trimmed or otherwise adjusted in production after assembly. For example, resistor 26 could be a flat laser or otherwise trimmable resistor connecting terminal member 23 with another terminal connector, not shown. Similarly, resistor 26 could be a strip resistor having a known resistance per unit length and connecting at one end to terminal member 23 and at the other to a different terminal member; not shown. In this case, an internal jumper connection could be made by solder or other means to the resistor at a point which would determine the effective resistance thereof.

Figure 4:
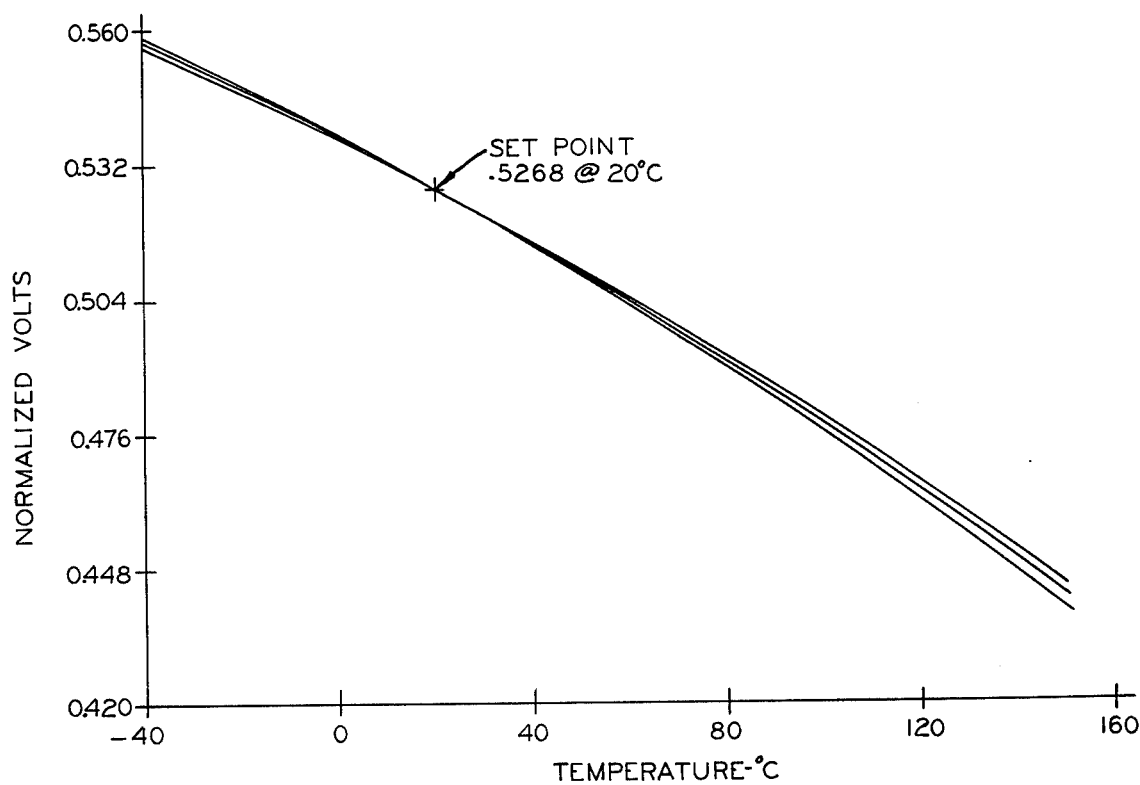
FIG. 4 shows a plurality of output temperature signal curves for samples of the sensor of this invention using piezoelectric elements of varying impedance.

Regardless of the means of adjusting and connecting resistor 26, a signal from a comparatively high frequency oscillator 30 is provided through resistor 26 to terminal member 23. Since terminal member 23 and spring 19 provide a low resistance path to piezoelectric disc 18 and brass disc 16 is grounded through throttle body 10, a voltage divider is set up comprising resistor 26 and piezoelectric disc 18. This voltage divider is shown in FIG. 2. Piezoelectric disc 18 is characterized by a substantially linear impedance-temperature relationship within the temperature range of −40° to 160° C., which is a useful temperature range for engine temperature measurements. Different samples of the sensor element 15 including piezoelectric disc 18 may provide slightly different impedance-temperature curves. However, during assembly of the sensor on the throttle body, the resistor 26 is trimmed or otherwise adjusted in resistance at a set ambient temperature of 20° C. to provide a predetermined normalized voltage output on terminal 23 as shown in FIG. 4. As shown in that figure, this results in an acceptably predictable temperature signal output.

The high frequency of oscillator 30, which is 50 kilohertz in this embodiment, is substantially outside the frequency range of interest in detecting most combustion related engine vibrations such as knock. Thus, the signals from the terminal 23 indicative of temperature and the vibration signals therefrom are readily separated by means of standard frequency discrimination filter techniques. Terminal 23 is thus shown in FIGS. 1 and 2 as being connected to the input of a low-pass filter 31 and a high-pass filter 32. The low-pass filter 31 provides at its output a vibration signal which may be provided to any suitable additional apparatus for signal processing and use in knock detection or combustion detection. The output of high-pass filter 32 is provided to a detector 33, which includes suitable filtering, to provide a DC temperature voltage signal. The circuitry could be arranged as shown in FIG. 2 to provide continuous detection of vibration and temperature or, if the times of occurrence of the engine related vibration phenomena were known, the output signals could be time multiplexed. In addition, either of filters 31 and 32 could be a bandpass filter for greater frequency selectivity.

It can be seen in FIG. 1 that flat bottom 14 of bore 12 is adjacent what appears to be an opening 40 in throttle body 10. Opening 40 is actually a depression in the surface of throttle body 10 which defines a bridge or diaphragm 42 of aluminum having as one side thereof flat bottom 14 of bore 12 against which sensor element 15 is biased. This structure appears to aid the reception of vibration signals from the engine and is useful in helping to tune the system for frequencies typical of knock.

In addition, since sensor failure or disconnection is liable to radically alter the output signal at the high or low frequency, the sensor further provides an indication of such conditions. Upon disconnection of a connecting cable, the DC voltage input level to the electronic processing circuitry will go to zero volts, as will any 6–8 or 50 kilohertz signal. Thus the sensor provides indication of its own operation as well as of engine vibration and temperature from a single vibration sensing element and series resistor.

The embodiments of the invention in which an exclusive property or privilege is claimed are defined as follows:

1. A combined vibration and temperature sensor for an internal combustion engine component comprising, in combination:
   a piezoelectric element effective to generate an output voltage when subjected to vibration and having an electrical impedance varying with temperature, within a predetermined temperature range, in a substantially predetermined manner at a predetermined electrical frequency, said piezoelectric element being mechanically and thermally coupled to the engine component to share the vibrations and temperature thereof;
   an electrical resistor connected in series with the piezoelectric element, said resistor having an impedance effective to produce a predetermined impedance ratio with said piezoelectric element at a predetermined temperature within said predetermined temperature range; and
   means effective to apply a constant predetermined alternating electrical voltage across said series connected piezoelectric element and resistor and separately sense the voltage generated across the piezoelectric element in response thereto and the voltage generated thereacross in response to vibration thereof, whereby the temperature and vibration of said engine component are sensed.

2. A combined vibration and temperature sensor for an internal combustion engine component comprising, in combination:
   a piezoelectric element effective to generate an output voltage when subjected to vibration and having an electrical impedance varying with temperature, within a predetermined temperature range, in a substantially predetermined linear manner at a predetermined electrical frequency higher than that characteristic of engine vibrations, said piezoelectric element being mechanically and thermally coupled to the engine component to share the vibrations and temperature thereof;

an electrical resistor connected in series with the piezoelectric element, said resistor having an impedance effective to produce a predetermined impedance ratio with said piezoelectric element at a predetermined temperature within said predetermined temperature range; and means effective to apply a constant predetermined alternating electrical voltage at said predetermined electrical frequency across said series connected piezoelectric element and resistor and separately sense the voltage generated across the piezoelectric element in response thereto at said predetermined electrical frequency and the voltage generated thereacross at a frequency characteristic of vibration thereof, whereby the temperature and vibration of said engine component are sensed.

3. A combined vibration and temperature sensor for an internal combustion engine throttle body comprising, in combination:

a piezoelectric disc effective to generate an output voltage when subjected to vibration and having an electrical impedance varying with temperature, within a predetermined temperature range, in a substantially linear predetermined manner at a predetermined electrical frequency higher than that characteristic of engine knock vibrations, said piezoelectric element being mechanically and thermally coupled to the throttle body to share the vibrations and temperature there- of;

an electrical resistor connected in series with the piezoelectric element, said resistor being of the type which is adjustable during assembly of the sensor and is so adjusted to produce a predetermined impedance ratio with said piezoelectric element at a predetermined temperature within said predetermined temperature range;

oscillator means effective to apply a constant predetermined alternating electrical voltage at said predetermined electrical frequency across said series connected piezoelectric element and resistor; and frequency discrimination means effective to sense the voltage generated across the piezoelectric element at said predetermined electrical frequency and the voltage generated thereacross at the frequency characteristic of engine knock vibrations, whereby separate signals of the temperature and vibration of said throttle body are provided.

* * * * *